United States Patent
Harel

(10) Patent No.: US 7,137,231 B2
(45) Date of Patent: Nov. 21, 2006

(54) DRYWALL BEAD WITH KNURLED PAPER FLAPS AND METHOD OF MAKING SAME

(75) Inventor: Kenneth N. Harel, Anaheim, CA (US)

(73) Assignee: Continuous Coating Corporation, Orange, CA (US)

( * ) Notice: Subject to any disclaimer, the term of this patent is extended or adjusted under 35 U.S.C. 154(b) by 0 days.

(21) Appl. No.: 10/790,477

(22) Filed: Mar. 1, 2004

(65) Prior Publication Data

US 2004/0163340 A1  Aug. 26, 2004

Related U.S. Application Data

(63) Continuation of application No. 09/933,229, filed on Aug. 20, 2001, which is a continuation-in-part of application No. 29/145,604, filed on Jul. 25, 2001, now Pat. No. Des. 457,972.

(51) Int. Cl.
 *E04B 1/68* (2006.01)
 *E04F 13/06* (2006.01)

(52) U.S. Cl. .................. 52/746.1; 52/255; 52/256; 52/745.19; 156/71; 156/153

(58) Field of Classification Search .......... 52/254–255, 52/287.1, 718.04, 717.03, 717.04–717.06, 52/745.19, 746.1; 156/71, 153
See application file for complete search history.

(56) References Cited

U.S. PATENT DOCUMENTS

| | | | | |
|---|---|---|---|---|
| 1,586,018 A | * | 5/1926 | Westberg | 52/443 |
| 2,012,203 A | | 8/1935 | Peterson | |
| 2,234,701 A | * | 3/1941 | Lyman | 52/417 |
| 2,649,890 A | | 8/1953 | Dunlap et al. | |
| 3,090,087 A | * | 5/1963 | Miller | 52/287.1 |
| 3,109,207 A | * | 11/1963 | Cooper | 52/255 |
| 3,365,854 A | | 1/1968 | Gallo | |
| 3,576,091 A | * | 4/1971 | Shull et al. | 52/309.3 |
| 4,144,368 A | | 3/1979 | Kim et al. | |
| 4,233,833 A | | 11/1980 | Balinski | |
| 4,241,146 A | | 12/1980 | Sivachenko et al. | |
| 4,313,991 A | * | 2/1982 | Lamb | 428/131 |
| 4,722,153 A | | 2/1988 | Hardy | |
| 4,863,774 A | * | 9/1989 | Tucker | 428/77 |
| 4,881,355 A | | 11/1989 | Bosl et al. | |
| 5,131,198 A | * | 7/1992 | Ritchie et al. | 52/287.1 |
| RE34,547 E | * | 2/1994 | Weldy | 52/288.1 |
| 5,442,886 A | | 8/1995 | Iacobelli | |
| 5,613,335 A | * | 3/1997 | Rennich et al. | 52/255 |
| 5,778,617 A | | 7/1998 | Free | |
| 5,836,122 A | * | 11/1998 | Rennich et al. | 52/254 |
| 6,189,273 B1 | | 2/2001 | Larson | |
| 6,260,323 B1 | | 7/2001 | Hockey | |
| 6,295,776 B1 | * | 10/2001 | Kunz et al. | 52/255 |
| D457,658 S | | 5/2002 | Harel | |

(Continued)

FOREIGN PATENT DOCUMENTS

FR    762500    4/1934

*Primary Examiner*—Carl D. Friedman
*Assistant Examiner*—Yvonne M. Horton
(74) *Attorney, Agent, or Firm*—Fulwider Patton LLP

(57) ABSTRACT

A drywall joint assembly strip device comprised of an elongate core having a cover bonded to its exterior surface and extending beyond its longitudinal edges to form flexible flaps in which longitudinal, parallel grooves and ridges and/or spaced-apart perforations are formed for flow of joint compound during the installation process.

22 Claims, 2 Drawing Sheets

U.S. PATENT DOCUMENTS 6,539,680 B1 4/2003 Kunz et al.
2002/0073639 A1 6/2002 Kunz et al.
2003/0089058 A1 5/2003 Kunz et al.
2003/0110721 A1 6/2003 Harel

* cited by examiner

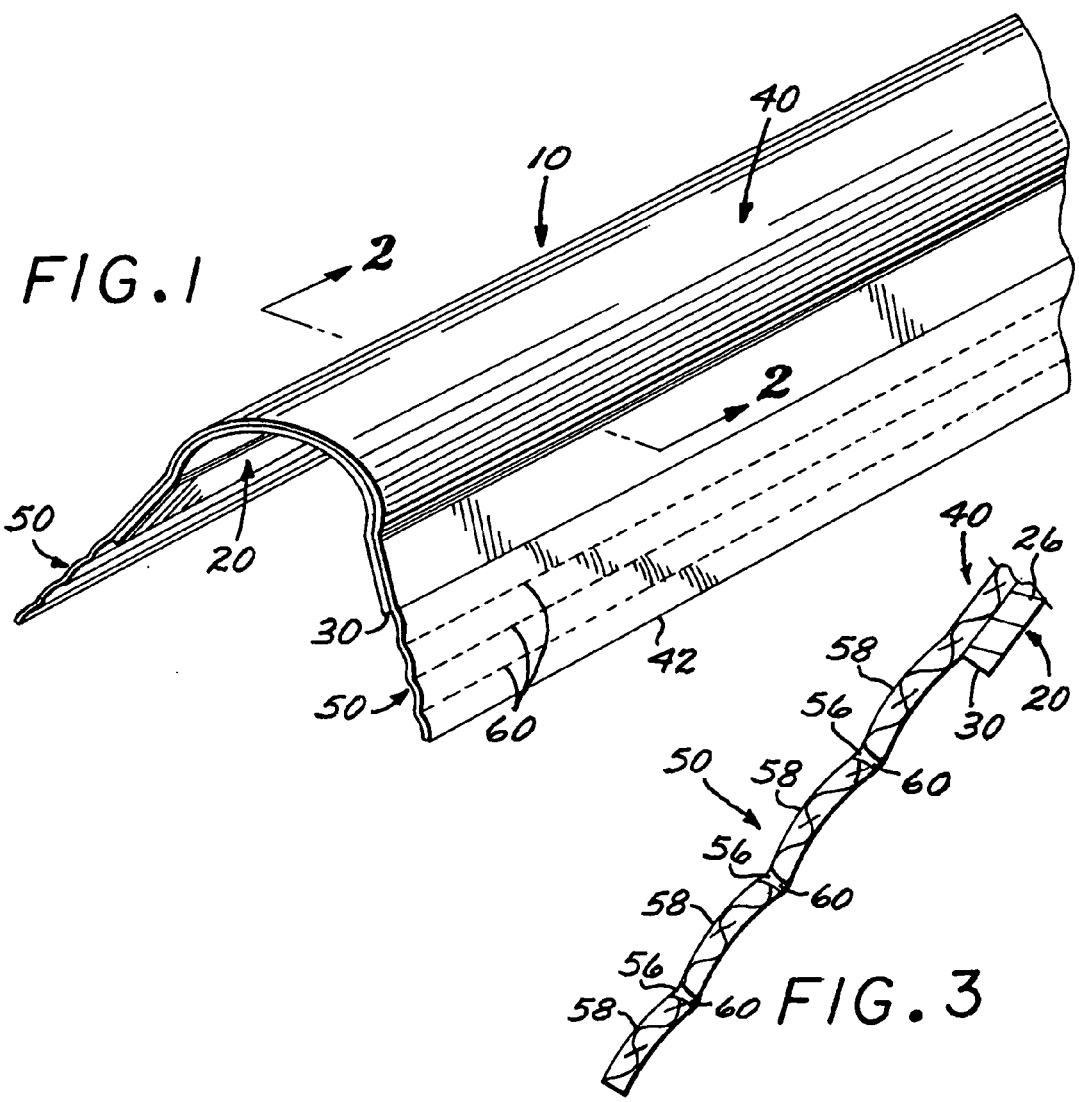
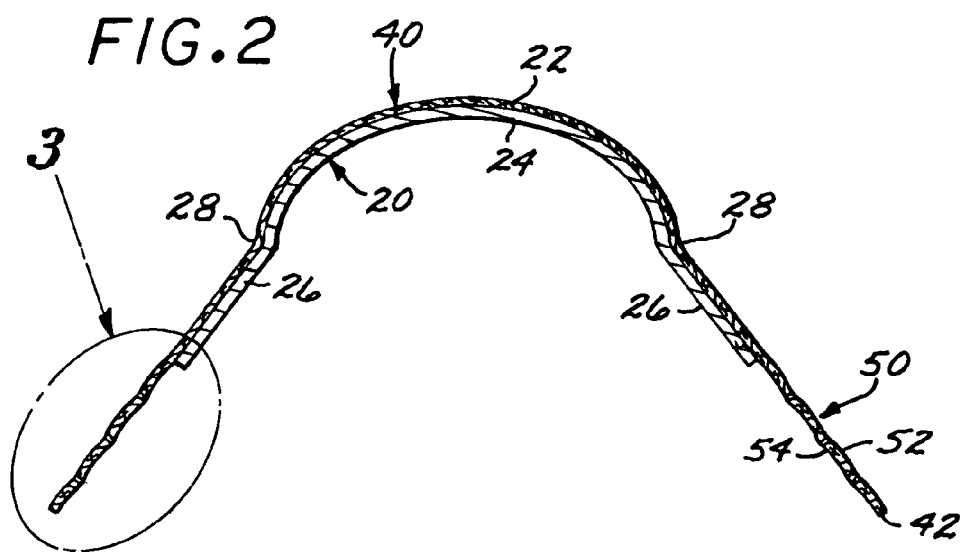

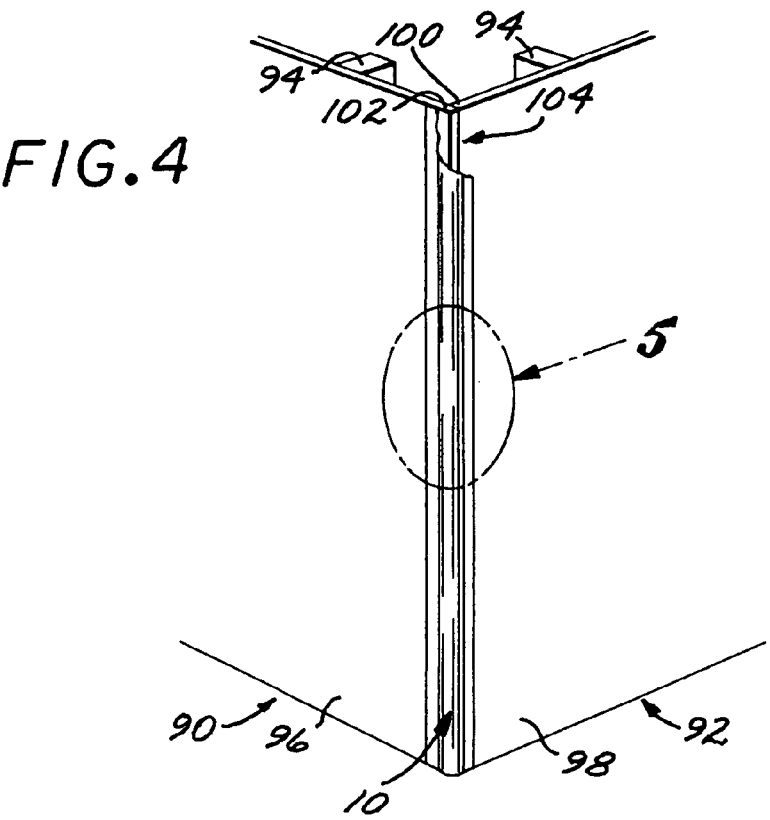
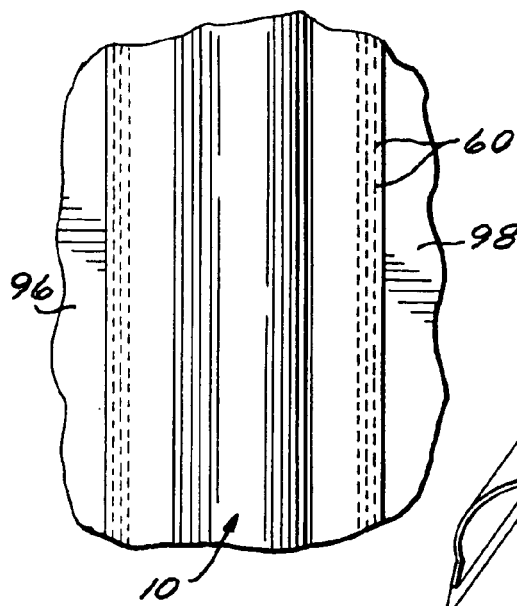
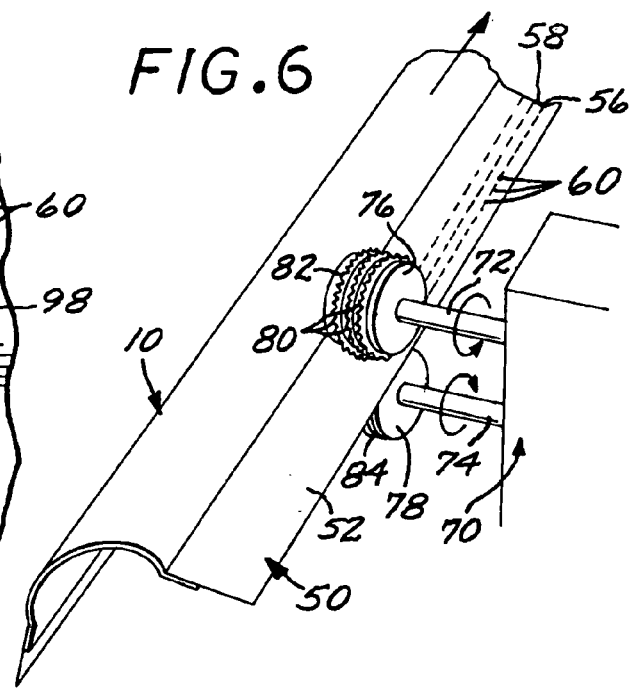

DRYWALL BEAD WITH KNURLED PAPER FLAPS AND METHOD OF MAKING SAME

This application is a continuation of U.S. patent application Ser. No. 09/933,229, filed on Aug. 20, 2001, which is a continuation-in-part of application Ser. No. 29/145,604, filed Jul. 25, 2001, now issued as U.S. Pat. No. D457,972.

BACKGROUND OF THE INVENTION

1. Field of the Invention

The present invention relates to drywall finish trim devices typically utilized in finishing a drywall installation at a corner joint or other terminus.

2. Description of the Prior Art

Drywall, sometimes also referred to as wallboard, is a staple in the construction industry as an economical alternative to plaster for forming the interior walls and ceilings of rooms in residential, commercial, and industrial buildings. The materials used in drywall construction include gypsum board, plywood, fibre-and-pulp boards, and asbestos-cement boards. The large, rigid sheets are fastened directly to the frame of a building with nails, screws, or adhesives, or are mounted on furring (strips of wood nailed over the studs, joists, rafters, or masonry, which allow free circulation of air behind the interior wall). A significant advantage of drywall construction is that the craftsman is not required to delay his or her finish work while the plaster spread over the interior support structure dries. Wallboard is manufactured in both finished and unfinished forms, and in its finished form may be faced with vinyl or other materials in a variety of permanent colors and textures so that they do not need to be painted when installed.

Drywall construction allows the drywall hanger to easily cut the panels to many different shapes and sizes for assembly and hanging from the building frame. However, workmen face a challenge in finishing drywall panels at an edge or corner. It is very difficult, if not impossible, to cut the edges of such panels with the precision, straightness, and smoothness required to abut the edges of adjoining panels in a sufficiently straight corner to provide an aesthetic finish. Additionally, cut edges expose the soft, raw cores of the drywall panels, thus requiring some sort of covering or treatment to afford a finished appearance.

As a result, several different devices and techniques have been developed in effort to produce a structurally sound corner or other joint that exhibits a smooth and seamless intersection. Devices proposed to achieve this result include drywall tape, trim and corner beads. Conventional drywall tape may be applied to the joints and edges of abutting panels to be covered by wet joint compound that is feathered and smoothed to cover the newly created seams. When the joint compound has dried, the tape and drywall can be sanded, painted, covered, or otherwise finished in whatever manner is desired. Great deal of skill is required, however, to apply and form the joint compound to create a sufficiently straight intersection that will exhibit, when taped and sanded to a finish, no evidence of scuffing and tearing in the tape.

In light of the limitations on use of drywall tape to trim a joint, trim strips or corner beads are often utilized to cover a joint and produce a seamless and aesthetically pleasing edge trim or intersection at the corners of drywall panels.

Such trim strips may take many different configurations and are typically in the form of an angle corner bead having diverging flanges or may be, for instance, a J strip to cap the edge of a dry wall panel. For the purposes of this invention, the particular configuration is not critical and use in conjunction with numerous different configurations is contemplated. For instance, the trim may be flat or configured with any one of a number of well known configurations, including corner trim with perpendicular flanges, corner trim with a rib formed at the juncture of the flanges defining a bead, flanges angled at 135° to one another, those configured with somewhat of a Z shape, those with soft line or rounded corners, and those with offsets or other configurations traditionally used in the trade and known to those skilled in the art.

One common feature of many of the trim strips or corner beads currently available is the use of a rigid or semi-rigid core that caps the drywall corner joint to provide support and to prevent the drywall from being chipped or cracked along the otherwise exposed edges of the panels. Typical materials known and used in the art for such cores include galvanized steel, aluminum, plastic, and sometimes stiff, thick paper. A disadvantage of these cores is that they must be anchored in some way as by nailing, screwing, or otherwise fastening to the drywall panels. A further disadvantage of such cores is that the drywall finishing compound applied to the corner joints to complete the assembly may not readily adhere to such rigid and semi-rigid core materials or easily conceal nail or screw heads, making it difficult to cover, sand, paint or otherwise finish out the corner joint in an aesthetically-pleasing manner.

To enhance the function and finished appearance of drywall corner joints configured with corner beads, efforts have been made to provide such beads with an exterior covering of some other material such as paper or fabric to facilitate both installation and application of the joint compound to the exterior surfaces thereof. The challenge is to provide such an exterior covering that is substantial enough to secure the inner core in position while being thin enough to create a smooth transition between the cover and the underlying drywall. One bead developed to address some of the problems with the prior art is a corner bead with a metal core, covered on its exterior with a paper cover which projects beyond the opposite lateral edges to form flexile, flaps to be secured in place as by nailing and embedding in joint compound. I have discovered that such flaps often fail to securely anchor the corner bead device in place thus allowing for shifting of the bead relative to the drywall thereby producing an irregular appearance.

It has been common practice to form such flaps with small holes for communication of moisture during the curing process for the joint compound. Oftentimes, such holes are formed by punching chads from one side of the flap often leaving one side of the chad attached. Consequently, some of the attached chads end up acting as flaps which close over the holes upon installation thus serving to block communication of joint compound through the respective chad holes.

It has also been discovered that prior art corner beads suffer the shortcoming that such flaps are often wavy throughout their length, making it difficult to effectively cover the flap material with a smooth layer of joint material to adequately securely anchor them in the joint compound.

Because these features have not been optimally satisfied in a single drywall bead design, there still exists a need for such a finishing bead that addresses each of these challenges. The present invention is directed to just such a drywall bead.

SUMMARY OF THE INVENTION

The present invention provides a drywall bead which is convenient to install and still effective to attractively cover and protect the drywall panel joint. The drywall joint assembly strip device of the present invention is characterized by lengthwise, longitudinal flexible flaps projecting from at least one side and configured with one or more longitudinal grooves and ridges to provide a mechanical anchor in the joint compound when covered therewith.

The strip device core is generally elongate and has exterior and interior surfaces. Preferably, a continuous cover having a width greater than the width of the core is bonded to the core's exterior surface such that the edges of the cover extend beyond the longitudinal edges of the core to form flexible flaps. As such, the lengthwise, alternating grooves and ridges are then formed along the flaps in a secondary operation. In one embodiment, lengthwise, spaced-apart perforations are formed along the grooves as well, as by knurling.

In use, then, the flaps of the drywall joint assembly strip device of the present invention provide flexibility about the longitudinal edges of the core, while the grooves and ridges cooperate to provide linear stiffness along the length of the flaps to maintain them flat during installation so that the device is convenient to use. In this regard, grooves and ridges, when embedded in the joint compound, serve to facilitate anchoring of the device in place in covering relationship over the joint. Additionally, in embodiments where the flaps are knurled with perforations of sufficient size for flow of the joint compound, such compound, when cured, will form a plurality of small columns or posts through such perforations to facilitate the anchoring of the flaps. Finally, by placing such perforations in the grooves formed in such flaps, the grooves themselves will serve to direct the joint compound through the spaced-apart perforations to the underside of the flaps to thus create a series of respective bridges through such flaps defining respective anchoring posts.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a partial perspective view of a drywall bead device embodying the present invention;

FIG. 2 is a transverse sectional view, in enlarged scale, taken along line 2—2 of FIG. 1;

FIG. 3 is a detailed view, in enlarged scale, taken from the oval identified by the numeral 3 in FIG. 2;

FIG. 4 is a perspective view, in reduced scale, of the drywall bead device shown in FIG. 1, partially in section, and covering a corner joint;

FIG. 5 is a detailed view, in enlarged scale, taken from the oval identified by the numeral 5 in FIG. 4; and FIG. 6 is a partial perspective view, in reduced scale, of a method of producing the drywall bead device shown in FIG. 1.

DETAILED DESCRIPTION OF THE PREFERRED EMBODIMENTS

As shown in the drawings for purpose of illustration, the present invention provides generally for an improved drywall bead 10 that is comprised of an elongate core 20 having a cover 40 bonded to the outside surface thereof to extend beyond the longitudinal side edges of the core to provide flexible flaps 50 in which longitudinal grooves 56 and ridges 58 are formed. Some embodiments include a longitudinal pattern of compound communicating perforations 60. While the present invention is described and depicted in detail as a drywall bead having a core with a curved cross-section and mounted on the typical vertical drywall corner joint, it will be appreciated by those skilled in the art that the invention can be used in conjunction with cores of most any cross-section on virtually any drywall joint.

Referring to FIGS. 1 and 2, in one embodiment elongate core 20 is formed having a generally curved transverse cross-section to form what is known as a bull nose shape defining a convex outer surface 22 and a concave inner surface 24. The elongate flanges 26 project laterally beyond the longitudinal edges of the core. In the embodiment of the strip device shown, transitions 28 are formed at the opposite sides of the bull nose curve to define slight bends serving to direct the respective flanges outwardly away from each other at an angle of about ninety degrees. The core may be made of a number of rigid or semi-rigid materials such as galvanized steel, aluminum, and a variety of plastics, including vinyl, nylon, and PVC. In a preferred embodiment, I have found that from parallel groove 56 and ridges 58 perform satisfactorily. A representative embodiment is formed with the grooves spaced laterally apart a distance of about ⅛th of an inch and the ribs formed to bow outwardly in transverse cross section as described below. Thus, once embedded in joint compound thereunder and the compound cured such ribs present respective barriers against lateral shifting of the respective flanges relative to the joint compound embedded in the respective grooves. Depending on the material selected and the core cross-section desired, the core may be formed through a variety of processes known in the art, including casting, molding, extruding, or roller-forming.

The elongate cover 40 is configured having a length substantially equal to that of the core 20 but with a greater transverse width. It is preferably made of a paper material, but may be made of other thin, flexible materials such as textiles and synthetic fabrics. In the preferred embodiment, the selected material is to have sufficient tensile strength to resist tearing or chafing, while being sufficiently flexible to facilitate installation, all the while having absorptive and surface characteristics that allow it to be effectively bonded both to the core and to a drywall surface and to, upon curing of the joint compound, provide an appearance complimentary to that of the adjacent drywall surface. It has been discovered that, in one embodiment these objectives are satisfied in a paper cover fabricated by mixing fibers and strengthening compound to encapsulate the fibers with a thin film and then combining three or more layers of such a film to produce a tear- and temperature-resistant paper cover material, as described in copending U.S. patent application Ser. No. 09/825,766, filed on Apr. 3, 2001, and now U.S. Pat. No. 6,665,101. While ideal for this application, it will be appreciated by those skilled in the art that other conventional stiff paper such as the covering paper typically used to cover the surface of drywall panels will suffice in this invention.

The paper defining the cover 40 is bonded to the outer surface 22 of the formed core 20, using a hot melt glue or other such adhesive known in the art. Such cover is wider than such core so that the opposite margins 42 project laterally beyond the longitudinal edges 30 of the core to form the flaps 50. In one embodiment, such cover is bonded centered on the core so that the flaps are symmetrical on the opposite sides thereof. Generally, the cover is rectangular so that the longitudinal edges extend parallel to the respective longitudinal edges of the core. By extending beyond the edges of the underlying rigid core, both the outwardly-facing surfaces 52 and inwardly-facing surfaces 54 of the flaps are exposed free of such core. Based on the grooved construction described and the thin, fibrous material from which the flaps are made, it will be appreciated that the flaps may be formed with a relatively straight longitudinal configuration and will resist flexing along the longitudinal axis while being somewhat flexible relative to the longitudinal edges of the core to facilitate conforming to the drywall surface projecting from the opposite edges of such core.

Referring now to FIG. 3, the elongate, flexible flaps 50 are configured along their length with one or more of the parallel grooves 56 and ridges 58. The ridges 58 are interposed lengthwise between the grooves and are generally parallel to them. In one embodiment, three grooves and four ridges are formed in each flap. As noted, such lengthwise grooves and ridges cooperate to serve the purpose of reinforcing ribs and to provide linear stiffness for the flaps, thereby minimizing longitudinal fluting or waviness in such flaps along their respective lengths while still allowing each flap to bend or flex relatively freely about an axis parallel to the respective longitudinal edges 30 of the core 20. It will be appreciated that this configuration maximizes the workability of the drywall joint assembly strip device 10 of the present invention, as the flaps are held straight in the longitudinal direction but are free to flex about vertical axes to lay down flat over the marginal edges of the joining drywall panels.

With continued reference to FIG. 3, in the preferred embodiment the spaced-apart perforations 60 are formed of sufficient size to communicate uncured joint compound between the outwardly-facing surfaces 52 and the inwardly-facing surfaces 54 of the flaps. In a preferred embodiment, I have found these perforations formed in longitudinal grooves arranged in a uniform pattern and having an opening of about 1/64 of an inch wide, about 1/16 of an inch long and spaced longitudinally apart about 3/32 of an inch from end to end work well. In this embodiment the center of the respective ribs 58 (FIG. 2) rise up about 1/64th of an inch from the bottom of the respective grooves thus making such its respective grooves about that deep. As will be appreciated by those skilled in the art, the cross sectional area of such perforations and density thereof may vary, it only being important that they allow for flow therethrough of the compound of the particular viscosity to be used to complete the joint and that such perforations be sufficiently dense in the flap to provide for a sufficient number of resultant compound posts to securely anchor the flap in the finished joint. The cross sectional area of such perforations for use with conventional compound can vary from about 0.0006 to about 0.05 square inches or even more depending on the characteristics of the compound used. The side walls of the ribs taper toward the grooves and the perforations themselves are generally tapered to narrow from the outside to the inside surface (FIG. 3), such that the opening of each perforation at the outwardly-facing surface is larger than the opening where each perforation intersects the inwardly-facing surface to compliment the shape of tapered side walls of such ribs in providing a funnel effect inwardly toward the body of the respective drywall panels. It will be appreciated that, as discussed below in more detail, in use, the grooves, ridges, and perforations cooperate to conveniently effectuate the installation of the joint assembly strip device 10 over a drywall corner joint.

Referring now to FIGS. 4 and 5, a typical drywall corner joint consists of a first drywall panel 90 and a second drywall panel 92 being mounted vertically to meet at a corner at approximately right angles to one another. The panels are installed on an internal wall support structure 94, such as framing, studs, joists, furring, or other such support structure known in the art, using a conventional fastening technique, such as nails, screws, or adhesives. The panels are configured to be substantially planar, such that the first drywall panel has a first exterior surface 96 and the second drywall panel has a second exterior surface 98 wherein both exterior surfaces face outwardly away from the building frame. The panels are further configured such that a first vertical edge 100 and a second vertical edge 102 of the respective first and second panels meet at right angles to form a drywall corner joint 104.

In use, the drywall joint assembly strip device 10 of the present invention is installed vertically in covering relationship over the drywall corner joint 104 such that the concave interior surface 24 of the core 20 is adjacent to the corner joint. Typically, the strip device is cut to a length substantially equal to the length of the corner joint so as to completely cover and protect the entire corner joint. Wet drywall joint compound is applied to the exterior surface of the strip and blended with the strip device 11 whether manually or by an application. The strip device is then applied to the desired corner juncture and a finishing layer compound applied to the exterior drywall surfaces all along the joint using a conventional troweling or other such technique known in the art in order to produced a smooth, aesthetically-pleasing, finished corner joint.

It will be appreciated by those skilled in the art that several beneficial and novel features of the drywall joint assembly strip device 10 of the present invention become evident in the installation process. First, as the strip device is positioned over the corner joint, the lengthwise grooves 56 and ridges 58 formed in the flaps 50 serve to provide linear stiffness so that the flaps minimize any waviness or fluting along their respective lengths. This allows the worker to easily vertically align the strip device over the drywall corner joint with such flaps relatively flat on the drywall surface. Moreover, because the grooves and ridges are configured lengthwise and generally parallel to the longitudinal edges 30 of the core 20, the flaps are still free to bend and flex and curve relative to their respective vertical planes. In this way, the grooves and ridges cooperate to provide both the flexibility relative to the edges of the core and the linear stiffness needed to allow a worker to position the strip device on the drywall corner with such flaps flat against the drywall surface while he or she applies the joint compound over such flaps to anchor them to the drywall panels themselves.

Second, on the respective one sides of the flaps, the joint compound will be worked into the grooves 56 between the ridges 58 to create compound ribs and will be worked into the undulations formed by the ridges on the opposite sides of such flaps to thus cooperate in mechanically trapping such flaps in the joint compound to anchor them solidly in place.

Third, for those embodiments where the perforations 60 are formed in spaced-apart relationship along the flaps 50 they provide for the wet joint compound to actually flow through to the inwardly-facing flap surfaces 54 and the underlying drywall exterior surfaces 96 and 98 to enhance the communication of compound from one side to the other and to construct small pins or posts in the respective such perforations. In this way, when the joint compound dries and cures, the drywall joint assembly strip device 10 is integrally locked in place by the mechanical entrapment of the ribs and grooves and also by the compound posts through the perforations.

A fourth beneficial installation feature of the drywall joint assembly strip device 10 relates to both the parallel grooves 56 and ridges 58 and the perforations 60. It will be appreciated that as wet joint compound is applied to the outwardly-facing surfaces 52 of the flaps 50, the grooves and ridges in the flaps cooperate to direct moisture along the grooves and into the perforations. Thus, the grooves, ridges and perforations cooperate to more effectively direct the wet joint compound toward the flaps' inwardly-facing surfaces 54 and the underlying exterior surfaces 96 and 98 of the drywall panels.

The drywall corner joint is finished out by applying and smoothing, or feathering, a sufficient amount of wet joint compound to the exterior surfaces of the drywall joint assembly strip device 10 so as to completely cover the strip device and blend the compound with the exposed exterior surfaces 96 and 98 of the drywall panels.

It will be appreciated that the drywall joint assembly strip device 10 of the present invention, with its longitudinally grooved flaps, provides for effective and efficient installation onto a typical drywall corner joint. For those embodiments with the knurling is operative to form perforations for communication of compound, the anchoring posts formed therein will further facilitate the anchoring function. Furthermore, it will be appreciated by those skilled in the art that any number of core configurations may be formed in producing the strip device described, causing the device to be versatile and suitable for use in a wide variety of drywall joint applications.

In an exemplary embodiment, the grooves 56, ridges 58, and perforations 60 on each flap 50 of the drywall joint assembly strip device 10 of the present invention are formed in a single operation. As shown in FIG. 6, one such means for forming all three features in one step is a mating roller device, or knurling machine 70. The machine generally has two parallel shafts aligned in a vertical plane: an upper shaft 72 and a lower shaft 74. An upper roller 76 and a lower roller 78 are mounted in rolling contact on the distal ends of the upper and lower shafts, respectively. The upper roller is configured with one or more axially spaced-apart circumferential rings 80 having radially spaced-apart pyramidal spikes, or knurling points 82, thereabout. The lower roller is configured with axially spaced-apart circumferential channels 84 positioned to accommodate the spiked rings of the upper roller.

The upper and lower shafts 72 and 74 rotate in opposite directions relative to one another, so that the upper roller 76 and lower roller 78 turn on each other and allow the flaps 50 to be fed between them one at a time. The shafts may be manually rotated or be driven by the knurling machine. In either case, a dry paper flap may be fed between the mating, rotating rollers to pass between them such that its outwardly-facing surface 52 faces the upper roller so that each ring 80 on the upper roller forces the flap material into the corresponding channel 84 on the lower roller to permanently deform the paper and form the respective grooves 56. At the same time, in those embodiments which are perforated, knurling teeth define points 82 to make multiple punctures in the respective flap along each groove to form the spaced-apart perforations 60. The flap material is forced by the rings into the engaging channels with sufficient force to permanently deform the paper forming such flaps to define on one side thereof high areas, defining the ridges 58, on either side of each groove. In this way, through a single operation, a knurled surface comprised of lengthwise grooves, ridges, and perforations is permanently formed along the outwardly-facing surface of each flap, thus completing the strip device 10. Therefore, it will be appreciated by those skilled in the art that the drywall joint assembly strip device of the present invention is capable of being produced in a convenient and cost-effective manner by being made of relatively common and inexpensive materials and by employing methods that are efficient and utilize equipment that is generally known in the art.

From the foregoing, it will be appreciated that the drywall joint assembly strip device of the present invention provides an effective and economical strip device for covering and protecting an underlying drywall joint. The strip device may be formed in many different configurations to suit a variety of drywall joint applications and optimizes the ease and effectiveness of installing the strip device on a drywall joint through its novel flexible flaps having lengthwise grooves and ridges and/or spaced-apart perforations for flow of joint compound to anchor such flaps.

Various modifications and changes may be made with regard to the foregoing detailed description without departing from the spirit of the invention.

What is claimed is:

1. A method of making a tape-on drywall accessory for drywall construction, including:
    selecting an elongated core strip having inward and outward faces, a corner portion extending from end to end, and at least one flange projecting transversely from the corner portion to an edge;
    selecting an elongated planar paper strip;
    affixing the paper strip to an outward face of the core strip such that a portion of the paper strip extends transversely beyond the edge of the at least one flange to form a planar flap; and
    after the affixing the step, permanently deforming the flap longitudinally along the length thereof to form a plurality of uniform depressions on the inward face thereof.

2. A method of claim 1 wherein:
    the deforming step includes deforming the flap to form depressions on both the inward and outward faces of the flap.

3. The method of claim 1 that includes:
    selecting the core strip of metal.

4. The method of claim 1 that includes:
    selecting the paper strip as being reinforced with a strengthening compound.

5. The method of claim 1 wherein:
    the paper strip is selected as being constructed of paper fabricated from fibers mixed with a strengthening compound.

6. The method of claim 1 wherein:
    the paper is selected as constructed of fibers encapsulated with a strengthening compound.

7. The method of claim 1 wherein:
    the affixing steps includes bonding the paper strip to the core.

8. The method of claim 1 that includes:
    permanently deforming the paper strip to form a plurality of depressions and ridges on the inward surface thereof.

9. The method of claim 1 that includes:
    deforming the flap to form parallel grooves and ridges on the outward surface thereof.

10. The method of claim 1 that includes:
    deforming the flap to form at least three depressions and four ridges on the inward surface thereof.

11. The method of claim 1 that includes:
    deforming the flap to form the uniform depressions spaced equidistant laterally apart.

12. The method of claim 1 that includes:
    deforming the flap along its length with perforations for communication of joint compound there through.

13. The method of claim 12 that includes:

deforming the flap with the perforations formed with an opening having a cross sectional dimension of at least $\frac{1}{16}^{th}$ of an inch.

14. The method of claim 12 that includes:

deforming the flap to form the perforations spaced apart at least $\frac{3}{32}^{nd}$ of an inch.

15. The method of claim 12 that includes:

deforming the flap with the perforations $\frac{1}{64}^{th}$ of an inch wide and $\frac{1}{16}^{th}$ of an inch long.

16. The method of claim 1 that includes:

deforming the flap to form the depressions are at least $\frac{1}{64}^{th}$ of an inch deep.

17. The method of claim 1 that includes:

reinforcing the flap with latex.

18. The method of claim 1 that includes:

deforming the flap with the depressions continuous along the length thereof configured to cooperate in providing linear stiffness to the flap.

19. The method of claim 1 wherein:

the core strip is selected formed with a pair of co-extensive flanges formed with opposite longitudinal edges;

the selecting of the strip includes selecting the strip having a lateral dimension wider than the width of the core strip;

the step of affixing the paper strip includes positioning it such that it projects transversely beyond the opposite longitudinal edges of the flange to form flaps projecting beyond such flange edges; and the step of deforming the flap includes deforming both flaps to form depressions on the respective inward faces thereof.

20. The method of claim 1 wherein:

the core strip is selected as being constructed of plastic.

21. The method of claim 1 wherein:

the strip is selected as being constructed of aluminum.

22. The method of claim 1 that includes:

forming the core strip with a rounded in transverse cross section corner portion.

* * * * *